United States Patent
Kwoczek et al.

(10) Patent No.: US 10,181,897 B2
(45) Date of Patent: Jan. 15, 2019

(54) DEVICE, VEHICLE, MOBILE COMMUNICATION SYSTEM, METHOD AND COMPUTER PROGRAM FOR A MOBILE BASE STATION TRANSCEIVER

(71) Applicant: VOLKSWAGEN AKTIENGESELLSCHAFT, Wolfsburg (DE)

(72) Inventors: Andreas Kwoczek, Lehre (DE); Moritz Schack, Braunschweig (DE); Björn Mennenga, Dresden (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/513,634

(22) PCT Filed: Sep. 7, 2015

(86) PCT No.: PCT/EP2015/070368
§ 371 (c)(1),
(2) Date: Mar. 23, 2017

(87) PCT Pub. No.: WO2016/045949
PCT Pub. Date: Mar. 31, 2016

(65) Prior Publication Data
US 2017/0302369 A1   Oct. 19, 2017

(30) Foreign Application Priority Data
Sep. 25, 2014   (DE) ................ 10 2014 219 400

(51) Int. Cl.
*H04B 7/26*   (2006.01)
*H04B 7/155*   (2006.01)
(Continued)

(52) U.S. Cl.
CPC ....... *H04B 7/2606* (2013.01); *H04B 7/15507* (2013.01); *H04B 7/15542* (2013.01);
(Continued)

(58) Field of Classification Search
CPC ............. H04B 7/2606; H04B 7/15542; H04B 7/15507; H04W 16/26; H04W 40/22
(Continued)

(56) References Cited

U.S. PATENT DOCUMENTS

2008/0107091 A1   5/2008   Ramachandran
2009/0016290 A1*  1/2009   Chion ............... H04W 72/1289
                                                    370/329
(Continued)

FOREIGN PATENT DOCUMENTS

EP   2840836 A1   2/2015
WO   2015017483 A1   2/2015

OTHER PUBLICATIONS

Eltahir et al.; An Enhanced Hybrid Wireless Mesh Protocol (E-HWMP) Protocol for Multihop Vehicular Communications; 2013 International Conference on Computer, Electrical and Electronics Engineering (ICCEEE); Aug. 26, 2013; pp. 1-8.
(Continued)

*Primary Examiner* — Ayodeji Ayotunde
(74) *Attorney, Agent, or Firm* — Barnes & Thornburg LLP

(57) ABSTRACT

A device for a mobile base station transceiver, a vehicle, a mobile communication system, a method and a computer program for a device. The device for a mobile base station transceiver in a mobile communication system includes a transceiver module to communicate with at least one fixed base station transceiver in the covering area thereof for providing a mobile coverage area, and to communicate with at least one further mobile base station transceiver in the mobile coverage area, wherein the mobile coverage area at least partially projects beyond the coverage area of the fixed base station transceiver by an extended coverage area.

12 Claims, 4 Drawing Sheets

(51) Int. Cl.
*H04W 16/26* (2009.01)
*H04W 40/22* (2009.01)
*H04W 84/00* (2009.01)
*H04W 88/04* (2009.01)

(52) U.S. Cl.
CPC ........... *H04W 16/26* (2013.01); *H04W 40/22* (2013.01); *H04W 84/005* (2013.01); *H04W 88/04* (2013.01)

(58) Field of Classification Search
USPC ........................................................ 455/561
See application file for complete search history.

(56) References Cited

U.S. PATENT DOCUMENTS

2010/0261479 A1    10/2010  Hidaka
2012/0127916 A1*   5/2012   Yoo .................... H04B 7/15507
                                                370/315
2016/0081082 A1*   3/2016   Cao ....................... H04W 76/15
                                                370/329

OTHER PUBLICATIONS

Search Report for German Patent Application No. 10 2014 219 400.8; dated Jul. 22, 2015.
Search Report for International Patent Application No. PCT/EP2015/070368; dated Apr. 22, 2016.
Eurecom; Open Air Interface Wireless Radio Platforms; Mobile Communications Department in collaboration with SoC Laboratory, Telecom ParisTech Sophia; Feb. 4, 2009.
Popovski et al.; Mobile and Wireless Communications Enablers for the Twenty-twenty Information Society; Deliverable D6.2; Initial report on horizontal topics, first results and 5G system concept; version 1, Jan. 4, 2014.

* cited by examiner

DEVICE, VEHICLE, MOBILE COMMUNICATION SYSTEM, METHOD AND COMPUTER PROGRAM FOR A MOBILE BASE STATION TRANSCEIVER

PRIORITY CLAIM

This patent application is a U.S. National Phase of International Patent Application No. PCT/EP2015/070368, filed 7 Sep. 2015, which claims priority to German Patent Application No. 10 2014 219 400.8, filed 25 Sep. 2014, the disclosures of which are incorporated herein by reference in their entirety.

SUMMARY

Exemplary embodiments relate to an apparatus for a mobile base station transceiver, a vehicle, a mobile communication system, a method for a mobile base station transceiver, and a program having a program code for performing a method for a mobile base station transceiver.

BRIEF DESCRIPTION OF THE DRAWINGS

Further configurations are described in more detail below on the basis of the exemplary embodiments depicted in the drawings, but in general there is no restriction overall to the exemplary embodiments. In the drawings.

DETAILED DESCRIPTION OF THE DISCLOSED EMBODIMENTS

Figure 1:
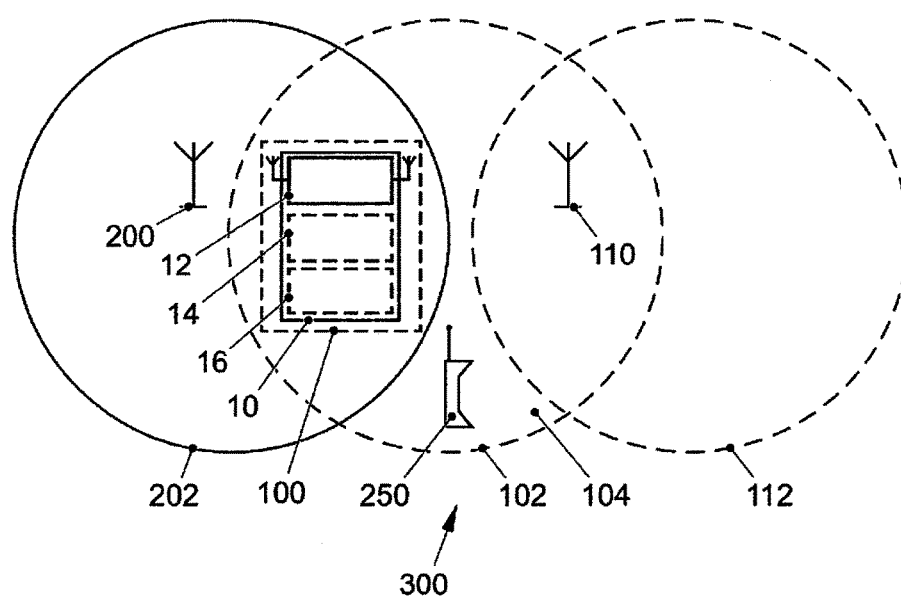
FIG. 1 shows a block diagram of an exemplary embodiment of a mobile base station transceiver in a mobile radio system having a fixed base station transceiver, a further mobile base station transceiver and a mobile transceiver.

Mobile communication systems are faced by eternally new challenges: they are used for a large number of services, such as, e.g., navigation with dynamically reloadable map material, music streaming or video streaming, communication via social networks and mobile Internet. At the same time, the requirements on the operators of the mobile communication systems, which need to establish an ever denser network of base stations to meet the bandwidth requirements of the users, are rising. Furthermore, the requirements of the users on local availability of a mobile radio link are also rising, however: if paper maps, offline navigation devices and voice telephony met the requirements of the users in remote regions in the past, then operators today are expected to provide adequate coverage with mobile Internet even at remote locations.

This presents challenges to operators of mobile communication systems, since the setup and operation of additional base stations is expensive and in some cases, such as, e.g., in mountainous landscapes and areas of low population, it is difficult to achieve complete coverage.

Further information about mobile base station transceivers can be found in "Mobile and wireless communications Enablers for the Twenty-twenty Information Society: Deliverable D6.2 report on horizontal topics, first and 5G system concept" and in the EURECOM presentation on "Open Air Interface Wireless Radio Platforms", for example.

There is, therefore, the need to provide the services of mobile communication systems or to improve connection even at locations that are not in the coverage area of base stations.

This need is met by the disclosed mobile base station, vehicle, mobile communication system, method for a mobile base station transceiver and program having a program code for performing a method for a mobile base station transceiver.

Some exemplary embodiments can allow this through the use of one or more mobile base station transceivers that are integrated in vehicles, for example. If, e.g., the mobile base station transceiver of a first vehicle is still in the coverage area of a fixed base station transceiver (or of a further mobile base station transceiver), and a further mobile base station transceiver of a second vehicle is in the coverage area of the mobile base station transceiver of the first vehicle, but not in the coverage area of the fixed base station transceiver, then the mobile base station transceiver of the second vehicle can, in some exemplary embodiments, use the mobile communication system handed over by the mobile base station transceiver of the first vehicle, and for its part can make it available to the mobile base station transceivers and mobile transceivers that are in its coverage area. Sometimes, this allows the coverage area of the mobile communication system to be extended distinctly without additional fixed base station transceivers being required. Since mobile base station transceivers can be integrated into vehicles, for example, that have sufficient power reserves for the operation of mobile base station transceivers, it is sometimes possible to achieve constant service within the coverage areas of the mobile base station transceivers, for example, along a road in an area having only inadequate coverage by fixed base station transceivers.

By way of example, the concatenation of multiple mobile base station transceivers would also allow the available bandwidth, latency and availability to be increased, since different elements of the chain may possibly lie in the coverage area of different fixed base station transceivers that can accordingly be used at the same time. Some exemplary embodiments can thus allow a cellular mobile radio system to be extended by means of mobile base station transceivers, for example, by a multiple transfer network component, made possible by means of multiple mobile base station transceivers.

Exemplary embodiments therefore provide a (first) mobile base station transceiver of a mobile communication system. The mobile communication system further has at least one fixed base station transceiver and at least one further (second) mobile base station transceiver. In this case, the mobile base station transceiver has a transceiver module for communication with at least one fixed base station transceiver whose coverage area it is in. Furthermore, the transceiver module is designed to provide a mobile coverage area for the at least one further (second) mobile base station transceiver, the mobile coverage area projecting beyond the coverage area of the at least one fixed base station transceiver at least to some extent by an extended coverage area. Some exemplary embodiments thereby achieve an enlargement of the coverage area of the mobile communication system.

In some exemplary embodiments, the mobile communication system can furthermore comprise at least one mobile transceiver, the transceiver module being designed for communication with the at least one mobile transceiver, so that, by way of example, mobile transceivers can use the coverage area of the mobile communication system, as enlarged by the mobile base station transceiver.

In some exemplary embodiments, the further mobile base station transceiver may be designed to provide a further mobile coverage area that extends the mobile coverage area of the first mobile base station transceiver and the coverage area of the fixed base station transceiver. In exemplary embodiments, this can be combined with a series of mobile base station transceivers, for example, so that it is sometimes possible for a multi-hop network for extending the coverage area of the fixed base station transceiver to be formed, as a result of which the coverage area of the mobile communication system is enlarged.

In exemplary embodiments, the transceiver module of the first mobile base station transceiver may, by way of example, also be designed for communication with at least one second mobile base station transceiver in the coverage area thereof, and may sometimes at the same time be designed to provide a mobile coverage area for at least one further mobile base station transceiver. In this case, the mobile coverage area of the first can project beyond the mobile coverage area of the at least one second further mobile base station transceiver at least to some extent by an extended coverage area. This allows extension of the coverage area, even if the mobile base station transceiver is not in the coverage area of a fixed base station transceiver.

In some exemplary embodiments, the transceiver module may sometimes be designed to use a different frequency in the extended coverage area than the fixed base station transceiver in the coverage area thereof, for example, to ensure a higher bandwidth and diversity of the radio resources used.

Exemplary embodiments can further use information about the position and the motion vector of a mobile base station transceiver to use a control module to determine the use of the radio resources of the mobile communication system and of another mobile communication system on the basis of position and motion vector. In some exemplary embodiments, the apparatus can to this end likewise comprise a positioning module that is designed to determine the information about the position and the motion vector of the mobile base station transceiver. The use of the position and motion information can thereby sometimes achieve better use of available radio resources or a radio resource use plan (such as, e.g., frequency planning or distribution).

In some exemplary embodiments, the control module may be designed to take the information about the position and the motion vector as a basis for determining information about a trajectory of the mobile base station transceiver. Based on information about this trajectory and, better, information about the frequency use, it is then possible to perform the allocation of the radio resources along the trajectory, for example. This can allow better coordination of the radio resources used.

In exemplary embodiments, the transceiver module may be designed to use one or more further mobile base station transceivers to communicate with one or more further fixed base station transceivers. This can sometimes increase bandwidth and fail safety for the communication of data with the fixed base station transceivers.

Vehicles having such an apparatus may likewise be an exemplary embodiment, the mobile base station transceiver being supplied with the power required for operation by the vehicle. In exemplary embodiments, it is also possible for the antennas of the vehicle to be used for communicating with fixed base station transceivers, mobile base station transceivers and/or mobile transceivers. Use of the apparatus with a vehicle can, in exemplary embodiments, allow use of the available power reserves and use of the available surface areas for large antennas.

In exemplary embodiments, the vehicle may be designed for communication with a fixed base station transceiver and for direct communication with another vehicle. This can allow machine-to-machine communication between multiple vehicles.

In some exemplary embodiments, at least two overlapping coverage areas of two mobile base station transceivers can use different frequency bands in the mobile communication system. This can sometimes increase the available bandwidth. In this respect, exemplary embodiments also provide a mobile base station transceiver that comprises the apparatus described above, and a mobile communication system having a mobile base station transceiver that comprises an apparatus as described above.

Exemplary embodiments further provide a method for a mobile base station transceiver of a mobile communication system according to the description above. The mobile communication system further has at least one fixed base station transceiver and at least one further mobile base station transceiver. The method comprises communicating with at least one fixed base station transceiver in the coverage area thereof and providing a mobile coverage area for the at least one further mobile base station transceiver. In this case, the mobile coverage area projects beyond the coverage area of the at least one fixed base station transceiver at least to some extent by an extended coverage area.

Exemplary embodiments further provide a program having a program code for performing the method when the program code is executed on a computer, a processor, a controller or a programmable hardware component. Exemplary embodiments also provide a digital storage medium that is machine-readable or computer-readable and that has electronically readable control signals that can interact with a programmable hardware component such that one of the methods described above is carried out.

Various exemplary embodiments will now be described more thoroughly with reference to the accompanying drawings depicting some exemplary embodiments. In the figures, the thickness dimensions of lines, layers and/or regions may be depicted in an exaggerated manner for the sake of clarity.

In the following description of the accompanying figures, which show only a few exemplary embodiments by way of example, like reference symbols can denote like or comparable components. Further, synoptic reference symbols can be used for components and objects that arise repeatedly in an exemplary embodiment or in a drawing but are described together for one or more features. Components or objects that are described using the same or synoptic reference symbols may be embodied in the same way, but if need be also differently, in terms of individual, multiple or all features, for example, their dimensions, unless the description explicitly or implicitly reveals anything different.

Although exemplary embodiments can be modified and altered in different ways, exemplary embodiments are represented as examples in the figures and are described in detail herein. However, it should be clarified that the intention is not for exemplary embodiments to be limited to the respectively disclosed forms, but rather for exemplary embodiments to cover all functional and/or structural modifications, equivalents and alternatives that are within the realm of the disclosed embodiments. Like reference symbols denote like or similar elements throughout the description of the figures.

It should be noted that an element that is referred to as "connected" or "coupled" to another element may be connected or coupled to the other element directly or that there may be intermediate elements. When an element is referred to as "directly connected" or "directly coupled" to another element, on the other hand, there are no intermediate elements. Other terms that are used to describe the relationship between elements should be interpreted similarly (e.g., "between" as opposed to "directly between", "adjoining" as opposed to "directly adjoining" etc.).

The terminology that is used herein serves only to describe exemplary embodiments and is not intended to limit the exemplary embodiments. As used herein, the singular forms "a", "an" and "the" are also intended to include plural forms unless the context explicitly indicates otherwise. Further, it should be clarified that expressions such as, e.g., "includes", "including", "has", "comprises", "comprising" and/or "having", as used herein, indicate the presence of the features, whole numbers, operations, workflows, elements and/or components but do not exclude the presence or the addition of one or more feature(s), whole number(s), operation(s), workflow(s), element(s), component(s) and/or group(s) thereof.

Unless stated otherwise, all terms used herein (including technical and scientific terms) have the same meaning as attributed to them by a person of average skill in the art in the field to which the exemplary embodiments belong. Further, it should be clarified that expressions, e.g., those that are defined in generally used dictionaries, are to be interpreted as though they have the meaning that is consistent with their meaning in the context of the relevant art, and are not to be interpreted in any idealized or excessively formal sense, unless this is explicitly defined herein.

FIG. 1 illustrates an exemplary embodiment of an apparatus 10 for a mobile base station transceiver 100 of a mobile communication system 300.

Exemplary embodiments can therefore make use of a transceiver/mobile radio that is designed for communicating data via a mobile radio system with a server or computer or another communication partner that is available via the Internet or the World Wide Web (WWW) or another network, for example. The mobile radio system may, by way of example, be based on one of the mobile radio systems that are standardized by applicable standardization committees, such as, e.g., the 3rd Generation Partnership Project (3GPP) group. By way of example, these comprise the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as, e.g., the Universal Mobile Telecommunication System (UMTS), Long Term Evolution (LTE) or LTE-Advanced (LTE-A), or else mobile radio systems of other standards, such as, e.g., Worldwide Interoperability for Microwave Access (WIMAX), IEEE802.16 or Wireless Local Area Network (WLAN), IEEE802.11, and also generally a system that is based on a time division multiple access (TDMA) method, frequency division multiple access (FDMA) method, code division multiple access (CDMA) method, orthogonal frequency division multiple access (OFDMA) method or another technology or multiple access method. The terms mobile radio system, mobile radio network and mobile communication system are used synonymously below.

The mobile communication system 300 further has at least one fixed base station transceiver 200 and at least one further mobile base station transceiver 110. It is subsequently assumed that such a mobile radio system 300 comprises at least one static transceiver in the sense of a fixed base station that has a connection to the line-connected part of the mobile radio network. On the other hand, it is assumed that the mobile radio network comprises at least one mobile transceiver (mobile radio terminal), the term mobile in this case being intended to relate to the fact that communication with this transceiver is via the air interface, i.e., wireless/cordless. A mobile transceiver of this kind can correspond, by way of example, to a portable telephone, a smartphone, a tablet computer, a portable computer or a radio module, which is not necessarily mobile in the sense that it actually moves in relation to its surroundings. The transceiver may also be static (e.g., relative to a motor vehicle) but communicate wirelessly with the mobile radio network. In this respect, the aforementioned base station can correspond to a base station from one of the standards mentioned above, for example, a NodeB, an eNodeB, etc.

A base station transceiver or a base station (these terms can be used equivalently) may be designed to communicate with one or more active mobile radios and to communicate in or adjacent to a service or coverage area of another base station transceiver or of a base station, e.g., as a macrocell base station or as a small-cell base station. Hence, disclosed embodiments can comprise a mobile communication system having one or more mobile radio terminals and one or more base stations, the base station transceivers being able to provide macrocells or small cells, e.g., picocells, metrocells or femtocells. A mobile transceiver or mobile radio terminal can correspond to a smartphone, a mobile phone, a user device, a radio, a mobile, a mobile station, a laptop, a notebook, a personal computer (PC), a personal digital assistant (PDA), a universal serial bus (USB) stick or universal serial bus adapter, a car, etc. A mobile transceiver can also be referred to as "User Equipment (UE)" or mobile in line with 3GPP terminology.

A base station transceiver or a base station may, at least from the perspective of a mobile radio terminal, be situated in a fixed or at least permanently connected part of the network or system. A base station transceiver or a base station can also correspond to a remote radio head, a relay station, a transmission point, an access point, a radio, a macrocell, a small cell, a microcell, a femtocell, a metrocell, etc. A base station or a base station transceiver is therefore understood to be a logical concept of a node/unit for providing a radio carrier or radio links via the air interface, which radio carrier or radio links is/are used to provide a terminal/mobile transceiver with access to a mobile radio network.

A base station or a base station transceiver can be a wireless interface for mobile radio terminals to a wired network. The radio signals used may be radio signals standardized by 3GPP or radio signals in general in accordance with one or more of the aforementioned systems. As such, a base station or a base station transceiver can correspond to a NodeB, an eNodeB, a base transceiver station (BTS), an access point, a remote radio head, a transmission point, a relay station, etc. that can be divided into further functional units.

A mobile radio terminal or mobile transceiver can be assigned to a base station or cell or may be registered therewith. The term cell relates to a coverage area of the radio services that are provided by a base station, e.g., by a NodeB (NB), an eNodeB (eNB), a remote radio head, a transmission point, a relay station, etc. A base station can provide one or more cells on one or more carrier frequencies. In some disclosed embodiments, a cell can also correspond to a sector. E.g., it is possible to form sectors with sector antennas that are designed to cover an angle section around an antenna site. In some disclosed embodiments, a base station may be designed to operate three or six cells or sectors, for example (e.g., 120° in the case of three cells and 60° in the case of six cells). A base station can comprise multiple sector antennas. The terms cell and base station can also be used synonymously below. Furthermore, a distinction is drawn between fixed and mobile base stations, mobile base stations also being able to act as mobile relay stations.

In other words, in the disclosed embodiments, the mobile communication system can also comprise a heterogeneous cell network (HetNet) that has different cell types, e.g., cells with closed user groups (also "close subscriber group CSG") and open cells and also cells of different size, such as, e.g., macrocells and small cells, the coverage area of a small cell being smaller than the coverage area of a macrocell. A small cell can correspond to a metrocell, a microcell, a picocell, a femtocell, etc. The coverage areas of the individual cells are provided by the base stations for their service areas and are dependent on the transmission powers of the base stations and the interference conditions in the respective area. In some disclosed embodiments, the coverage area of a small cell may be surrounded at least to some extent by a service area of another cell or can match or overlap the service area of, e.g., a macrocell to some extent. Small cells can be used to extend the capacity of the network. A metrocell can therefore be used to cover a smaller surface area than a macrocell, e.g., metrocells are used to cover a road or a section in a built-up area. For a macrocell, the coverage area can have a diameter in the order of magnitude of one kilometer or more, for a microcell the coverage area can have a diameter of less than one kilometer, and a picocell can have a coverage area with a diameter of less than 100 m. A femtocell can have the smallest coverage area and it can be used to cover a domestic area, a motor vehicle area or a gate area at an airport, for example, i.e., its transmission area can have a diameter of below 50 m.

The apparatus moreover comprises a transceiver module 12 for communication with at least one fixed base station transceiver 200 in the coverage area 202 of the at least one fixed base station transceiver 200. In exemplary embodiments, the transceiver module 12 can contain typical transmitter and receiver components. These can include, by way of example, one or more antennas, one or more filters, one or more mixers, one or more amplifiers, one or more diplexers, one or more duplexers, etc. The transceiver module 12 is designed to provide a mobile coverage area 102 for the at least one further mobile base station transceiver 110, the mobile coverage area 102 projecting beyond the coverage area 202 of the at least one fixed base station transceiver 200 at least to some extent by an extended coverage area 104.

Figure 5:
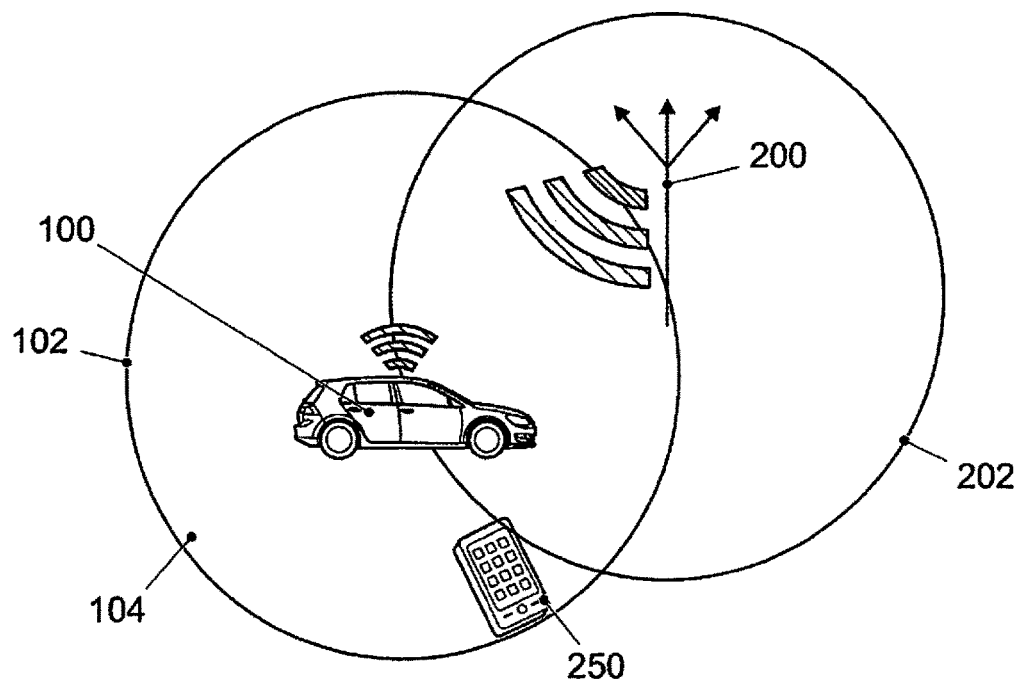
FIG. 5 shows an exemplary embodiment in conjunction with a fixed base station transceiver and a mobile transceiver.

Further, FIG. 1 illustrates an exemplary embodiment in which the communication system 300 comprises at least one mobile transceiver 250 and wherein the transceiver module 12 is further designed for communication with the at least one mobile transceiver 250. This can, as is illustrated in FIG. 5, also happen when no further mobile base station transceiver communicates with the mobile base station transceiver 100, for example.

Figure 2:
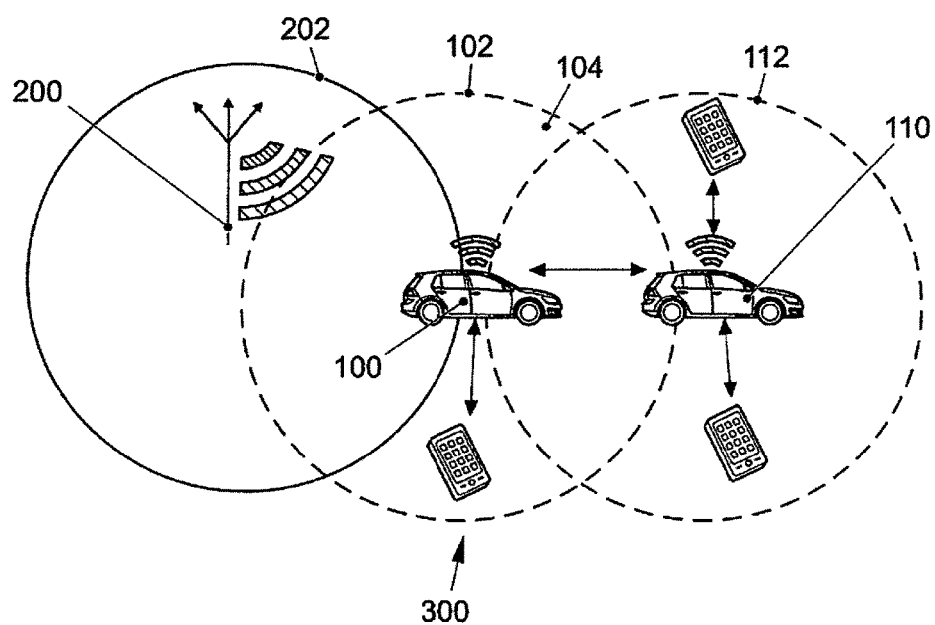
FIG. 2 shows an exemplary embodiment in conjunction with two mobile base station transceivers and a fixed base station transceiver with the respective coverage areas.

In further exemplary embodiments, FIGS. 1 and 2 also illustrate how the further mobile base station transceiver 110 is designed to provide a further mobile coverage area 112 that extends the mobile coverage area 102 and the coverage area 202 of the fixed base station transceiver 200. In application examples, it is thus possible for the apparatus 10 to be designed to form with the further mobile base station transceiver 110 a multi-hop network for extending the coverage area 202 of the fixed base station transceiver 200, for example. In exemplary embodiments, such a multi-hop network can also be used to set up a separate network independently of operators of mobile communication systems, for example, with unused frequency bands or frequency bands of cooperating operators being used in this case, for example. The network can then sometimes be used to make network capacity available to cooperating operators.

In some exemplary embodiments, the apparatus 10 further comprises a control module 16 for controlling the transceiver module 12. In exemplary embodiments, the control device or the control module 16 can correspond to any controller or processor or to a programmable hardware component. By way of example, the control module 16 may also be realized as software that is programmed for an applicable hardware component. In this respect, the control module 16 may be implemented as programmable hardware with appropriately adapted software. In this case, it is possible to use any processors, such as digital signal processors (DSPs). Exemplary embodiments are not restricted to one type of processor in this case. Any processors or multiple processors are conceivable for implementing the control module 16.

The control module 16 is sometimes designed to allocate radio resources of the mobile communication system 300 or of another mobile communication system 400 to the transceiver module 12. In exemplary embodiments, the allocation is based on information about a position and a motion vector of the mobile base station transceiver 100. In some exemplary embodiments, the apparatus can further comprise a positioning module 14 that is designed to determine the information about the position and the motion vector of the mobile base station transceiver 100. In exemplary embodiments, the positioning module 14 may be implemented as any component that allows ascertainment or determination of information regarding a position of the apparatus or of the positioning module 14. Conceivable examples are receivers for satellite-based navigation systems, e.g., a GPS (Global Positioning System) receiver, or other components that allow position finding by means of triangulation of received radio signals, for example.

In some exemplary embodiments, the control module 16 may further be designed to take the information about the position and the motion vector as a basis for determining information about a trajectory of the mobile base station transceiver 100, and to perform the allocation of the radio resources based on the information about the trajectory and a piece of frequency use information along the trajectory to increase the available bandwidth through interference management or targeted radio resource management. The information about position, motion vector and trajectory can, in exemplary embodiments, likewise be used for other services, for example, emergency services and driver assistance.

Figure 3:
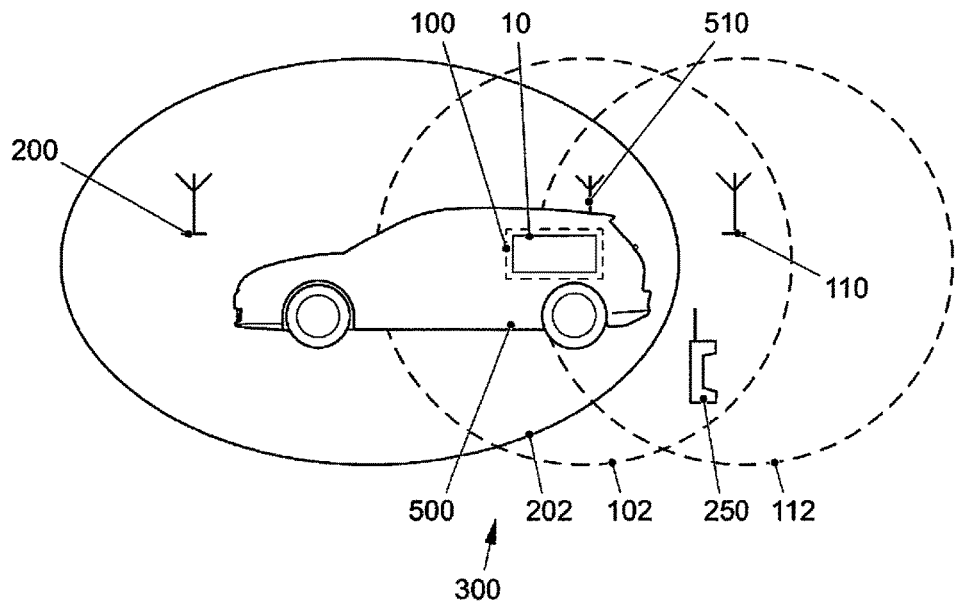
FIG. 3 shows an exemplary embodiment of a vehicle that has a mobile base station transceiver with the apparatus for the mobile base station transceiver.

As FIG. 3 shows, in some exemplary embodiments, a vehicle can have the apparatus 10 for a mobile base station transceiver 100, in which case the mobile base station transceiver 100 is supplied with the power required for operation by the vehicle 500. Suitable vehicles are all conceivable vehicles, such as motor vehicles or trucks, but also two-wheeled vehicles, such as motorcycles or bicycles, and also ships and aircraft. Exemplary embodiments can have a positive effect for ships if the range of commercial mobile radio networks that are normally available only on land or near to the coast can also be provided at sea, where conventional coverage is linked to great problems. Similarly, it can be extended to airspaces, for example, in conjunction with direct air to ground communication.

The mobile base station transceiver can in this case use the antennas 510 of the vehicle 500, for example, to communicate with the at least one fixed base station transceiver 200 and/or to communicate with the at least one further mobile base station transceiver 110 and/or to communicate with the at least one mobile transceiver 250. As a result of the possible use of the base station transceiver 100 or the apparatus 10*m* in a vehicle, the base station transceiver 100 or the apparatus 10 is often depicted as a transmitting vehicle 500 in the further figures.

The integration of the mobile base station transceiver 100 into a vehicle 500 can sometimes result in an enlarged coverage area, since the antenna 510 can have benefits in terms of the height and the size and the spacing of multiple input multiple output (MIMO) antennas, for example. It is sometimes possible for the vehicle surface area to be fitted with more antenna elements than would usefully be usefully possible on a conventional mobile station and for accordingly more complex reception and transmission concepts to be used, since more space and power are available.

Figure 7:
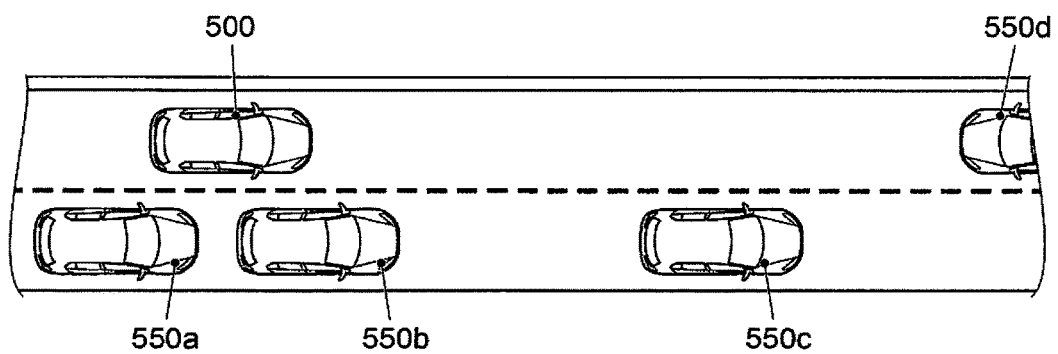
FIG. 7 shows an exemplary embodiment in a direct communication between vehicles.

As FIG. 7 illustrates, the transceiver module may be designed not only for communication with a fixed base station transceiver 200, but also for direct communication with another vehicle 550, for example. In this case, the vehicle is able, in direct communication with further vehicles 550*a-d*, to coordinate overtaking procedures and lane mergers, for example, between multiple vehicles and/or to avoid accidents involving wild animals and other hazard situations. Such communication can be used to coordinate a gap that is necessary for a vehicle to filter in between further vehicles.

Figure 4:
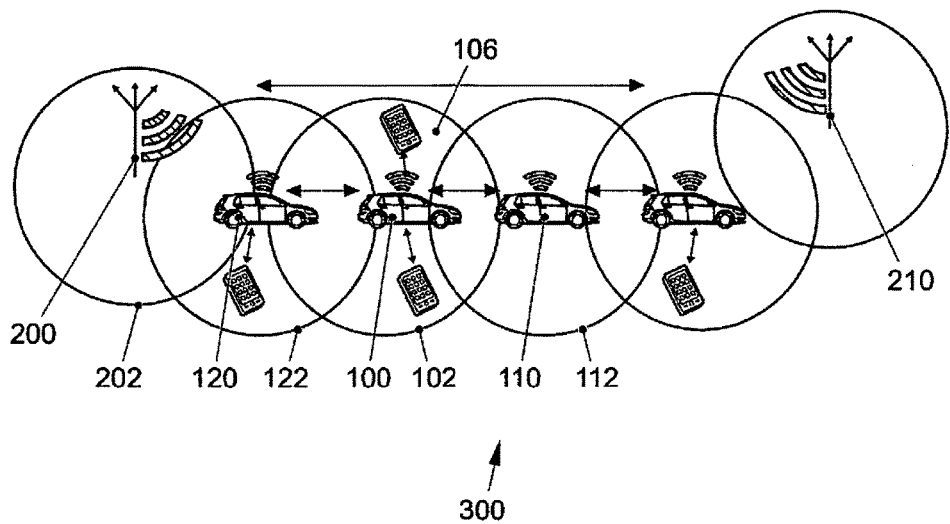
FIG. 4 shows an exemplary embodiment in conjunction with multiple fixed base station transceivers with which the exemplary embodiment in a mobile base station transceiver communicates via multiple further mobile base station transceivers.

FIG. 4 shows an exemplary embodiment, wherein the transceiver module 12 is designed for communication with at least one further mobile base station transceiver 120 in a coverage area 122 of the at least one further mobile base station transceiver 120, wherein the transceiver module 12 is further designed to provide a mobile coverage area 102 for the at least one mobile base station transceiver 110, the mobile coverage area 102 projecting beyond the mobile coverage area 122 of the at least one further mobile base station transceiver 120 at least to some extent by an extended coverage area 106. In some exemplary embodiments, the transceiver module 12 may further be designed to use a different frequency in the extended coverage area 102 or 106 than the fixed base station transceiver 200 in the coverage area 202. In exemplary embodiments, it is furthermore possible for at least two overlapping coverage areas of two mobile base station transceivers to use different frequency bands, for example.

As FIG. 4 further shows, the transceiver module 12 may, in exemplary embodiments, further be designed to use one or more further mobile base station transceivers 120 and 110 to communicate with one or more further fixed base station transceivers 210. This allows the capacity of the backhaul link of the mobile communication system to be increased using the mobile base station transceivers 100, 110 and 120 that are involved and/or allows the latency thereof to be decreased, or allows connection reliability to be increased in general.

Figure 6:
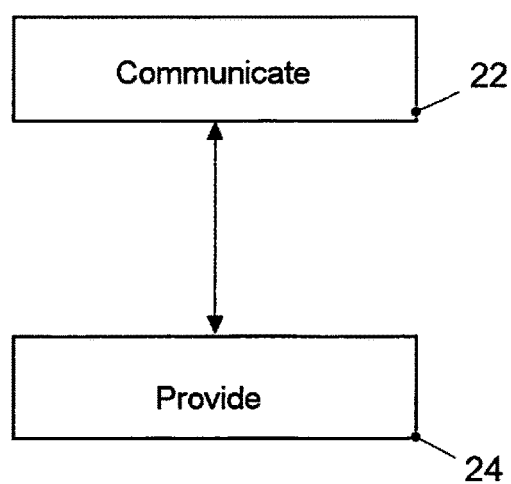
FIG. 6 shows a block diagram of a flowchart for an exemplary embodiment of a method.

FIG. 6 shows a flowchart for an exemplary embodiment of a method for a mobile base station transceiver 100 of a mobile communication system 300. In this case, the mobile communication system 300 further has at least one fixed base station transceiver 200 and at least one further mobile base station transceiver 110. The method comprises communicating 22 with at least one fixed base station transceiver 200 in the coverage area 202 of the at least one fixed base station transceiver 200 and providing 24 a mobile coverage area 102 for the at least one further mobile base station transceiver 110, the mobile coverage area 102 projecting beyond the coverage area 202 of the at least one fixed base station transceiver 200 at least to some extent by an extended coverage area 104.

A further exemplary embodiment is a computer program for performing at least one of the methods described above when the computer program runs on a computer, a processor or a programmable hardware component. A further exemplary embodiment is also a digital storage medium that is machine-readable or computer-readable and that has electronically readable control signals that can interact with a programmable hardware component such that one of the methods described above is carried out.

The features disclosed in the description above, the claims below and the enclosed figures may be of importance, and can be implemented, both individually and in any desired combination, for the realization of an exemplary embodiment in its various configurations.

Although some embodiments have been described in connection with an apparatus, it goes without saying that these embodiments also represent a description of the corresponding method, so that a block or a component of an apparatus should also be considered as a corresponding method operation or as a feature of a method operation. Analogously to this, embodiments described in connection with or as a method operation also represent a description of a corresponding block or detail or feature of a corresponding apparatus.

Depending on implementation requirements, exemplary embodiments may be implemented in hardware or in software. The implementation can be performed using a digital storage medium, for example, a floppy disk, a DVD, a Blu-Ray disc, a CD, a ROM, a PROM, an EPROM, an EEPROM or a FLASH memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field programmable gate array having a microprocessor (FPGA).

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is performed. At least one exemplary embodiment is therefore a data storage medium (or a digital storage medium or a computer-readable medium) on which the program performing one of the methods described above is recorded.

Generally, exemplary embodiments may be implemented as a program, firmware, computer program or computer program product having a program code or as data, wherein the program code or the data is or are operative to the effect of performing one of the methods when the program runs on a processor or a programmable hardware component. The program code or the data may, by way of example, also be stored on a machine-readable storage medium or data storage medium. The program code or the data can be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represents the program.

A program according to at least one exemplary embodiment can implement one of the methods while it is performed, for example, by reading memory locations or writing a datum or multiple data thereto, as a result of which, if need be, switching processes or other processes are brought about in transistor structures, in amplifier structures or in other electrical components, optical components, magnetic components or components operating on another functional principle. Accordingly, reading a memory location allows data, values, sensor values or other information to be captured, determined or measured by a program. Therefore, by reading one or more memory locations, a program can capture, determine or measure variables, values, measured variables and other information, and by writing to one or more memory locations, it can bring about, prompt or perform an action and actuate other devices, machines and components.

The exemplary embodiments described above are merely an illustration of the principles. It goes without saying that modifications and variations of the arrangements and details described herein will become apparent to other persons skilled in the art. Therefore, the intention is for the disclosed embodiments to be restricted only by the scope of protection of the patent claims below, and not by the specific details that have been presented herein on the basis of the description and the explanation of the exemplary embodiments.

LIST OF REFERENCE SYMBOLS

10 Apparatus
12 Transceiver module
14 Positioning module
16 Control module
22 Communication
24 Provision
100 Mobile base station transceiver
102 Coverage area of the mobile base station transceiver
104 Extended coverage area of the mobile base station transceiver
106 Extended coverage area of the mobile base station transceiver
110 Further mobile base station transceiver
112 Coverage area of the further mobile base station transceiver
120 Further mobile base station transceiver
122 Coverage area of the further mobile base station transceiver
200 Fixed base station transceiver
202 Coverage area of the fixed base station transceiver
250 Mobile transceiver
300 Mobile communication system
400 Further mobile communication system
500 Vehicle
510 Antenna of the vehicle
550 (a-d) Further vehicle

The invention claimed is:

1. An apparatus for a mobile base station transceiver of a mobile communication system, wherein the mobile communication system further has at least one fixed base station transceiver and at least one further mobile base station transceiver, the apparatus comprising:
   a transceiver module for communication with at least one fixed base station transceiver in the coverage area of the at least one fixed base station transceiver, wherein the transceiver module provides a mobile coverage area for the at least one further mobile base station transceiver, the mobile coverage area projecting beyond the coverage area of the at least one fixed base station transceiver at least to some extent by an extended coverage area; and
   a control module for controlling the transceiver module, wherein the control module allocates radio resources of the mobile communication system or of another mobile communication system to the transceiver module based on information about a position and a motion vector of the mobile base station transceiver.

2. The apparatus of claim 1, wherein the communication system comprises at least one mobile transceiver and wherein the transceiver module communicates with the at least one mobile transceiver.

3. The apparatus of claim 1, wherein the further mobile base station transceiver provides a further mobile coverage area that extends the mobile coverage area and the coverage area of the fixed base station transceiver.

4. The apparatus of claim 1, which forms, with the further mobile base station transceiver, a multi-hop network for extending the coverage area of the fixed base station transceiver.

5. The apparatus of claim 1, wherein the transceiver module communicates with at least one further mobile base station transceiver in a coverage area of the at least one further mobile base station transceiver, wherein the transceiver module further provides a mobile coverage area for the at least one mobile base station transceiver, the mobile coverage area projecting beyond the mobile coverage area of the at least one further mobile base station transceiver at least to some extent by an extended coverage area.

6. The apparatus of claim 1, wherein the transceiver module uses a different frequency in the extended coverage area than the fixed base station transceiver in the coverage area.

7. The apparatus of claim 1, further comprising a positioning module to determine the information about the position and the motion vector of the mobile base station transceiver.

8. The apparatus of claim 1, wherein the control module takes the information about the position and the motion vector as a basis for determining information about a trajectory of the mobile base station transceiver, and performs the allocation of the radio resources based on the information about the trajectory and a piece of frequency use information along the trajectory.

9. The apparatus of claim 1, wherein the transceiver module communicates one or more further mobile base station transceivers with one or more further fixed base station transceivers.

10. A mobile communication system having multiple apparatuses for mobile base station transceivers of a mobile communication system, wherein the mobile communication system further has at least one fixed base station transceiver, each apparatus comprising:
    a transceiver module for communication with at least one fixed base station transceiver in the coverage area of the at least one fixed base station transceiver, wherein each transceiver module provides a mobile coverage area for the at least one further mobile base station transceiver, the mobile coverage area projecting beyond the coverage area of the at least one fixed base station transceiver at least to some extent by an extended coverage area, wherein at least two overlapping coverage areas of two mobile base station transceivers use different frequency bands; and
    a control module for controlling the transceiver module, wherein the control module allocates radio resources of the mobile communication system or of another mobile communication system to the transceiver module based on information about a position and a motion vector of the mobile base station transceiver.

11. A method for a mobile base station transceiver of a mobile communication system, wherein the mobile communication system further has at least one fixed base station transceiver and at least one further mobile base station transceiver, the method comprising:
    communicating with at least one fixed base station transceiver in the coverage area of the at least one fixed base station transceiver;
    providing a mobile coverage area for the at least one further mobile base station transceiver, the mobile coverage area projecting beyond the coverage area of the at least one fixed base station transceiver at least to some extent by an extended coverage area; and
    allocating radio resources of the mobile communication system or of another mobile communication system to the transceiver module based on information about a position and a motion vector of the mobile base station transceiver.

12. A program embodied on a non-transitory computer-readable medium having a programming code for performing a method for a mobile base station transceiver of a mobile communication system, wherein the mobile communication system further has at least one fixed base station transceiver and at least one further mobile base station transceiver, in response to an execution of the program code on a computer, a processor, a controller or a programmable hardware component, the method comprising:
    communicating with at least one fixed base station transceiver in the coverage area of the at least one fixed base station transceiver,
    providing a mobile coverage area for the at least one further mobile base station transceiver, the mobile coverage area projecting beyond the coverage area of the at least one fixed base station transceiver at least to some extent by an extended coverage area, and
    allocating radio resources of the mobile communication system or of another mobile communication system to the transceiver module based on information about a position and a motion vector of the mobile base station transceiver.

* * * * *